(12) United States Patent
Karuppiah et al.

(10) Patent No.: US 11,237,760 B2
(45) Date of Patent: Feb. 1, 2022

(54) MEASURING PERFORMANCE METRICS FOR DATA STORAGE DEVICES

(71) Applicant: Western Digital Technologies, Inc., San Jose, CA (US)

(72) Inventors: Muthukumar Karuppiah, San Ramon, CA (US); Khurram Ismail, Milpitas, CA (US); Anuj Awasthi, Fremont, CA (US); Rohit Sindhu, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 83 days.

(21) Appl. No.: 16/721,314

(22) Filed: Dec. 19, 2019

(65) Prior Publication Data

US 2021/0191648 A1    Jun. 24, 2021

(51) Int. Cl.
*G06F 11/34* (2006.01)
*G06F 3/06* (2006.01)
*G06F 11/30* (2006.01)

(52) U.S. Cl.
CPC .......... *G06F 3/0659* (2013.01); *G06F 3/0625* (2013.01); *G06F 3/0673* (2013.01); *G06F 11/3062* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 6,975,963 B2 * | 12/2005 | Hamilton | G06F 11/3466 702/182 |
| 8,935,578 B2 | 1/2015 | Alexander et al. | |
| 9,304,690 B2 * | 4/2016 | McCambridge | G06F 3/0613 |
| 9,563,367 B2 * | 2/2017 | Chu | G06F 3/0679 |
| 9,665,459 B2 * | 5/2017 | Banerjee | G06F 11/32 |
| 9,898,427 B2 | 2/2018 | Bergsten et al. | |
| 10,852,805 B2 * | 12/2020 | Magcale | G06F 11/3452 |
| 2017/0228169 A1 | 8/2017 | Seong et al. | |
| 2018/0321987 A1 * | 11/2018 | Benisty | G06F 9/528 |

(Continued)

*Primary Examiner* — Elias Mamo
(74) *Attorney, Agent, or Firm* — Ravi Mohan; Rutan & Tucker, LLP

(57) ABSTRACT

In one embodiment, an apparatus is provided. The apparatus includes a first interface configured to communicate with a computing device. The apparatus also includes a second interface configured to communicate with a data storage device. The apparatus further includes a processing device coupled to the first interface and the second interface. The processing device is configured to receive, from the computing device via the first interface, a request to measure a set of performance metrics for the data storage device. The processing device is also configured to identify a set of commands used to measure the set of performance metrics for the data storage device. The processing device is further configured to determine whether the set of commands has been performed by the data storage device. The processing device is further configured to determine the set of performance metrics based on a set of results for the set of commands in response to determining that the set of commands has been performed by the data storage device. The processing device is further configured to transmit the set of performance metrics to the computing device.

20 Claims, 6 Drawing Sheets

(56) References Cited

U.S. PATENT DOCUMENTS

| | | |
|---|---|---|
| 2019/0035445 A1 | 1/2019 | Huang |
| 2019/0250831 A1* | 8/2019 | Shin ..................... G06F 3/0679 |
| 2020/0257448 A1* | 8/2020 | Darwin ............... G06F 11/0757 |

* cited by examiner

MEASURING PERFORMANCE METRICS FOR DATA STORAGE DEVICES

BACKGROUND

Field of the Disclosure

This disclosure relates to data storage devices. More particularly, the disclosure relates to measuring performance metrics for data storage devices.

Description of the Related Art

Data storage devices may be used to store data used by computing devices. The computing devices may execute applications, apps, services, processes, threads, etc., that may read, write, update, and/or access data that is stored on the data storage devices. For example, a computing device may store a file on a data storage device. In another example, a computing device may read files from a data storage device.

SUMMARY

In one embodiment, an apparatus is provided. The apparatus includes a first interface configured to communicate with a computing device. The apparatus also includes a second interface configured to communicate with a data storage device. The apparatus further includes a processing device coupled to the first interface and the second interface. The processing device is configured to receive, from the computing device via the first interface, a request to measure a set of performance metrics for the data storage device. The processing device is also configured to identify a set of commands used to measure the set of performance metrics for the data storage device. The processing device is further configured to determine whether the set of commands has been performed by the data storage device. The processing device is further configured to determine the set of performance metrics based on a set of results for the set of commands in response to determining that the set of commands has been performed by the data storage device. The processing device is further configured to transmit the set of performance metrics to the computing device.

In one embodiment, a method is provided. The method includes receiving, from a computing device via a first interface, a request to measure a set of performance metrics for a data storage device. The method also includes identifying a set of commands used to measure the set of performance metrics for the data storage device. The method further includes determining whether the set of commands has been performed by the data storage device. The method further includes determining the set of performance metrics based on a set of results for the set of commands in response to determining that the set of commands has been performed by the data storage device. The method further includes transmitting the set of performance metrics to the computing device.

In one embodiment, a system is provided. The system includes a computing device and a performance metric device coupled to the computing device. The performance metric device includes a first interface configured to communicate with the computing device and a second interface configured to communicate with a data storage device. The system also includes a processing device coupled to the first interface and the second interface. The processing device is configured to receive, from the computing device via the first interface, a request to measure a set of performance metrics for the data storage device. The processing device is also configured to identify a set of commands used to measure the set of performance metrics for the data storage device. The processing device is further configured to determine whether the set of commands has been performed by the data storage device. The processing device is further configured to determine the set of performance metrics based on a set of results for the set of commands in response to determining that the set of commands has been performed by the data storage device. The processing device is further configured to transmit the set of performance metrics to the computing device.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
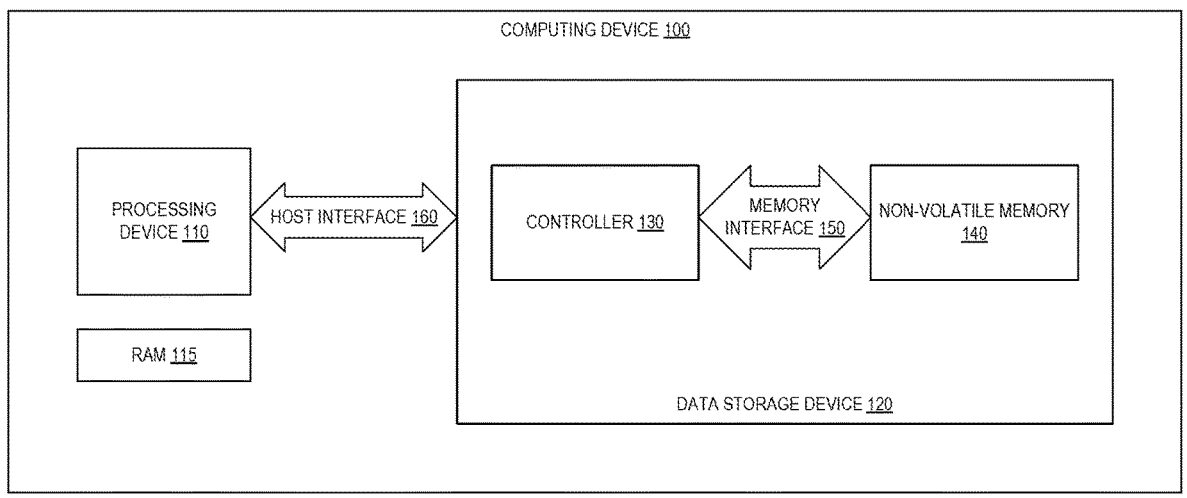
FIG. 1 is a block diagram illustrating an example computing device, in accordance with one or more embodiments of the present disclosure.

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example implementations, configurations, and/or embodiments relating to encoding and/or decoding digital videos using controllers (e.g., processors, processing devices, etc.) of data storage devices.

Data storage devices, such as memory cards (e.g., secure digital (SD) cards), memory sticks (e.g., universal serial bus (USB) stick, thumb drives, etc.), solid state drives (SSDs), hard disk drives (HDDs), hybrid drives (e.g., storage drives/devices that include both magnetic media/medium and flash memory), etc., typically include one or more controllers coupled with one or more non-volatile memory (NVM) arrays. The controllers may execute commands (e.g., access commands, data access commands, etc.) to read, write, access, etc., data that may be stored in the one or more NVM arrays.

As discussed above, data storage devices may be used to store and/or access data used by computing devices. The computing devices may execute applications, apps, services, processes, threads, etc., that may read, write, update, and/or access data that is stored on the data storage devices. It may be useful to determine the performance of the data storage device during the design, manufacture, and/or normal usage of the data storage device. For example, during the manufacturing process for data storage devices, it may be useful to test the performance of the data storage device to ensure that the data storage device performs as expected. In another example, when new software or firmware is installed on the data storage device if may be useful to determine whether the performance of the data storage device is affected by the new software or firmware.

Analyzers, oscilloscopes, bus tracers, and/or tools that may be used to analyze the performance of the data storage device (e.g., to determine one or more performance metrics of the data storage device) are often expensive and may not operate with all different types of data storage device. In addition, devices drivers may generate logs with driver level timestamps to indicate when different operations, actions, and/or events occur. However, driver level timestamps may not have good timing accuracy/resolution when measuring the performance metrics. For example, a driver may not generate a log until the driver is allowed to write to the log by the computing devices (e.g., when the process executing the driver is scheduled to execute by the operating system of the computing device). This may cause delays in the driver level timestamps because an operation may be performed at one time, but may not be logged until tens or hundreds of milliseconds later.

The embodiments, implementations, examples, etc., disclosed herein may be able to obtain performance metrics with a higher degree of timing accuracy/resolution and at a lower cost. A performance metric device may decode, analyze, encode, and/or forward packets within microseconds. This allows the performance metric device to determine when a data storage device started execution of commands and when the data storage device completed the commands at a microsecond level. This allows the performance metric device to measure latency, data throughput, power consumption, at a much higher degree of timing accuracy/resolution than analyzers, oscilloscopes, bus tracers, tools, and device drivers (e.g., at a microsecond level, rather than at the level of tens or hundreds of milliseconds).

FIG. 1 is a diagram illustrating an example computing device 100, in accordance with some embodiments of the present disclosure. The computing device 100 includes a processing device 110, a random access memory (RAM) 115, and data storage device 120. The processing device 110 may be one or more devices that execute instructions (e.g., executes machine instructions, code, machine code, etc.). Examples of a processing device may include, but are not limited to a controller, a system-on-a-chip (SoC), a field-programmable gate array (FPGA), an application-specific integrated circuit (ASIC), a central processing unit (CPU), a processor, a multi-core processor, a graphics processing unit (GPU), etc. The RAM 115 may be a volatile memory that stores data that may be used by the processing device 110. A volatile memory may be a memory (or other device that stores data and allows access to the data) that does not retain the data when power is not provided to the volatile memory (e.g., when power is turned off).

The computing device 100 may be a device that may execute services, processes, applications, apps, instructions, etc., to perform one or more operations. Examples of computing devices include, but are not limited to, phones (e.g., smart phones, cellular phones, etc.), cable set-top boxes, smart televisions (TVs), video game consoles, laptop computers, tablet computers, desktop computers, server computers, personal digital assistances, wearable devices (e.g., smart watches), media players, cameras, and/or other types of electronic devices. The computing device may also be referred to as a host system. The computing device 100 may be coupled to one or more networks and/or other computing devices via the one or more networks. A network (not illustrated in the figures) may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

The data storage device 120 is illustrated as part of the computing device 100 (e.g., may be located inside of a housing, chassis, case, slot, etc., of the computing device 100) in FIG. 1. In other embodiments, the data storage device 120 may be separate from the computing device 100 (e.g., may be an external device that is coupled to the computing device 100 via a cable or port, such as a universal serial bus (USB) cable or port). In one embodiment, the data storage device 120 may be a hot swappable device. A hot swappable device may be a device that can be removed from the computing device 100 or added to the computing device 100 while the computing device remains in operation. In another embodiment, the data storage device 120 may lack a power source (e.g., lack an internal power source, such as a battery). The data storage device 120 may receive power to operate the data storage device 120 from the computing device 100.

The data storage device 120 may incorporate access command scheduling and/or execution in accordance with embodiments, examples, and/or implementations disclosed herein. The data storage device 120 may be any type of data storage device, drive, module, component, system, or the like. Furthermore, the terms "card," "memory card," "drive," "flash drive," "memory stick," "storage drive," "hard drive" and "data storage drive" may be used herein in certain contexts to refer to any type of data storage device, and may be used substantially interchangeably with the term "data storage device" herein in connection with various embodiments and/or in various contexts. As shown, the data storage device 120 (e.g., hybrid hard drive, solid-state drive, a memory card, any storage device utilizing solid-state memory, a hard disk drive, any storage device utilizing magnetic media/medium, etc.) includes a controller 130 (e.g., control circuitry, software, firmware, or a combination thereof) and a non-volatile memory 140. For example, the data storage device 120 may be a secure digital (SD) card, a miniSD card, a microSD card, a compact flash (CF) card, a multimedia card (MMC), an eXtreme digital (xD) card, etc.

The non-volatile memory (NVM) 140 may be configured for long-term storage of data and may retain data between power on/off cycles of the data storage device 120. The non-volatile memory 140 and/or portions of the non-volatile memory 140 may also be referred to as a storage medium. In some embodiments, the non-volatile memory 140 may include solid-state memory. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple level cell memory, X4 cell memory, etc.), NOR memory, EEPROM, Ferroelectric Memory (FeRAM), magnetoresistive RAM (MRAM), or other discrete solid-state memory chips.

In other embodiments, the non-volatile memory 140 may include magnetic media (including shingle magnetic recording), optical disks, floppy disks, electrically programmable read only memories (EPROM), electrically erasable programmable read only memories (EEPROM), etc. Non-volatile memory that uses magnetic media/medium may include one or more magnetic platters. Each platter may contain one or more regions of one or more tracks of data. The non-volatile memory 140 may include any combination of the one or more types of memories described here. The non-volatile memory 140 may be divided logically and/or physically into cells, dies, arrays, planes, blocks, pages, tracks, and sectors.

The controller 130 may include one or more processors, memory devices, data and/or power transmission channels/paths, boards, or the like. In some embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the controller 130 may be mounted on a printed circuit board (PCB). The controller 130 may be configured to receive data commands from a storage interface (e.g., a device driver) residing on the computing device 100.

The controller 130 may communicate with the computing device 100 over a host interface 160, and may receive commands via the host interface 160. A host interface 160 may be hardware, software, and/or a combination thereof that allows the processing device to communicate with the data storage device 120. Examples of host interfaces include, but are not limited to, peripheral component interconnect express (PCIe), serial AT attachment (SATA), serial attached small computer system interface (SAS), non-volatile memory express (NVMe), etc. These commands may be referred to as data commands, data access commands, data storage access commands, etc. Data commands may specify a block address in the data storage device 120. Data may be accessed/transferred based on such data commands. For example, the controller 130 may receive data commands (from the computing device 100) and may execute such commands on/in the non-volatile memory 140 (e.g., in one or more arrays, pages, blocks, sectors, etc.). The data commands received from computing device 100 may include read data commands, write data commands, and erase data commands. The controller 130 may be coupled to the non-volatile memory (NVM) 140 via a memory interface 150. In one embodiment, the memory interface 150 may include a plurality of channels (e.g., one or more lines, pines, wires, traces, etc.) and each channel may be coupled to different portions of the non-volatile memory 140 (e.g., different NVM arrays, different flash arrays, etc.).

The controller 130 may execute the received data commands to read, write, and erase data from non-volatile memory 140, via the memory interface 150. For example, the commands may include a read command (e.g. a data read command) to read a block of data from the non-volatile memory 140. The controller 130 may read the data from the page and may transmit the data to the computing device 100 via the host interface 160. In another example, the commands may include a write command (e.g., a data write command) to write data to a page in a non-volatile memory 140. In one embodiment, write commands may include program commands (e.g., a command to write the value "1" to a location the non-volatile memory 140) and erase commands (e.g., a command to write the value "0" to a location, a page, a block, etc., in the non-volatile memory array). The controller 130 may receive the data from the computing device 100 via the host interface 160 and may write the data to the page.

The controller 130 may include an encoder (not illustrated in the figures). The encoder 131 may encode data when storing the data on the non-volatile memory 140. The encoder may encode the data to protect the data from errors, loss, corruption, etc. The encoder may protect the data from errors, loss, corruption, etc., using various methods, techniques, functions, operations, actions, etc. For example, the encoder may protect the data by generating parity data (e.g., parity bits). The parity bits may allow the controller 130 to determine whether there are errors in the data (e.g., errors due to corruption, damaged cells, damaged blocks, error while reading the data, etc.). The parity bits may also allow the controller 130 to correct or recover from errors in the data.

In some embodiments, the encoder encodes stored data using error correction codes (ECCs). An error correction code may include algorithms, methods, techniques, functions, operations, etc., that may encode data into codewords. The codewords (e.g., encoded data) may be decoded even though there may be errors in one or more portions of the codewords. For example, even though one or more bits of the codeword may be incorrect or corrupted (e.g., due to a faulty memory cell), the error correction code can still be used to decode or recover the data encoded in the codeword. One type of error correction code used by the encoder may be may be a low-density parity-check code (LDPC). Another type of binary code used by the encoder 131 may be may be a polar code. The encoder may use the ECCs to generate codewords. A codeword may be a string or series of bits (e.g., a bit string) that is generated based on the data received by the encoder 131 (which is to be stored on the non-volatile memory 140). The codeword may allow the data, which is encoded in the polar code codeword, to be recovered when errors occur.

The controller 130 may also include a decoder (not illustrated in the figures). The decoder may decode data that is stored on the non-volatile memory 140. In some embodiments, decoder decodes stored data (e.g., data encoded into codewords which are stored on the non-volatile memory 140) using ECCs. For example, the decoder 132 may decode codewords which encode the data that is stored on the non-volatile memory 140. The decoder 132 may perform error detection to determine the integrity of data retrieved from non-volatile memory 140 (e.g., to determine the integrity of the data encoded in a codeword). The decoder 132 may also perform error correction of retrieved data. For example, the decoder 132 may use parity data, codewords, etc., to recover the data.

The data storage device 120 may store data received from the computing device 100 such that the data storage device 120 acts as data storage for the computing device 100. To facilitate this function, the controller 130 may implement a logical interface. The logical interface may present to the computing device memory as a set of logical addresses (e.g., sequential/contiguous addresses) where data may be stored. Internally, the controller 130 may map logical addresses to various physical memory addresses in the non-volatile memory arrays 141 and/or other memory module(s). Mapping data indicating the mapping of logical addresses to physical memory addresses may be maintained in the data storage device. For example, mapping table data may be stored in non-volatile memory 140 in order to allow for recreation of mapping tables following a power cycle.

In one embodiment, the processing device 110 may access data that is stored in the data storage device 120. For example, the processing device 110 may read, write, and/or access data in the non-volatile memory 140. For example, computing device 100 may be a camera (e.g., a video camera, a security camera) and the data storage device 120 may be a memory card (e.g., a SD card) that is coupled to the processing device 110 (e.g., that is inserted into a slot in the computing device 100). As the computing device 100 captures (e.g., records, takes, etc.) images and/or video, the computing device 100 may store the images and/or video on the data storage device 120. For example, the computing device 100 may provide the images and/or video to the data storage device 120 and the controller 130 may write the images and/or video to the non-volatile memory 140.

As discussed above, data storage devices may be used to store and/or access data used by computing devices. It may be useful to determine the performance of the data storage device during the design, manufacture, and/or normal usage of the data storage device. For example, during the manufacturing process for data storage devices, it may be useful to test the performance of the data storage device to ensure that the data storage device performs as expected. In another example, when new software or firmware is installed on the data storage device if may be useful to determine whether the performance of the data storage device is affected by the new software or firmware.

Generally, analyzers, oscilloscopes, bus tracers, and/or tools may be used to analyze the performance of the data storage device (e.g., to determine one or more performance metrics of the data storage device). However, these analyzers, oscilloscopes, bus tracers, and/or tools are often expensive and may not operate with all different types of data storage device. Driver level timestamps (e.g., timestamps in logs created by drivers for the data storage device) may also be used to determine performance metrics for a data storage device. However, the operations of the drivers are scheduled by a process of a computing device and thus, there may be a delay when the timestamps are generated. This may decrease the timing accuracy of the performance metrics by tens or hundreds of milliseconds.

Thus, it may be useful to measure the performance metrics with a high degree of timing accuracy and/or resolution. For example, it may be useful to measure the performance metrics (e.g., latency, throughput, power usage over time, etc.) of the data storage device at a microsecond granularity. In addition, a lower cost solution may also be useful as this may allow the solution to be more widely deployed to test more data storage device. For example, custom analyzers, oscilloscopes, bus tracers, and/or tools, often cost tens or hundreds of thousands of dollars, and still may not provide enough accuracy or resolution.

Figure 2:
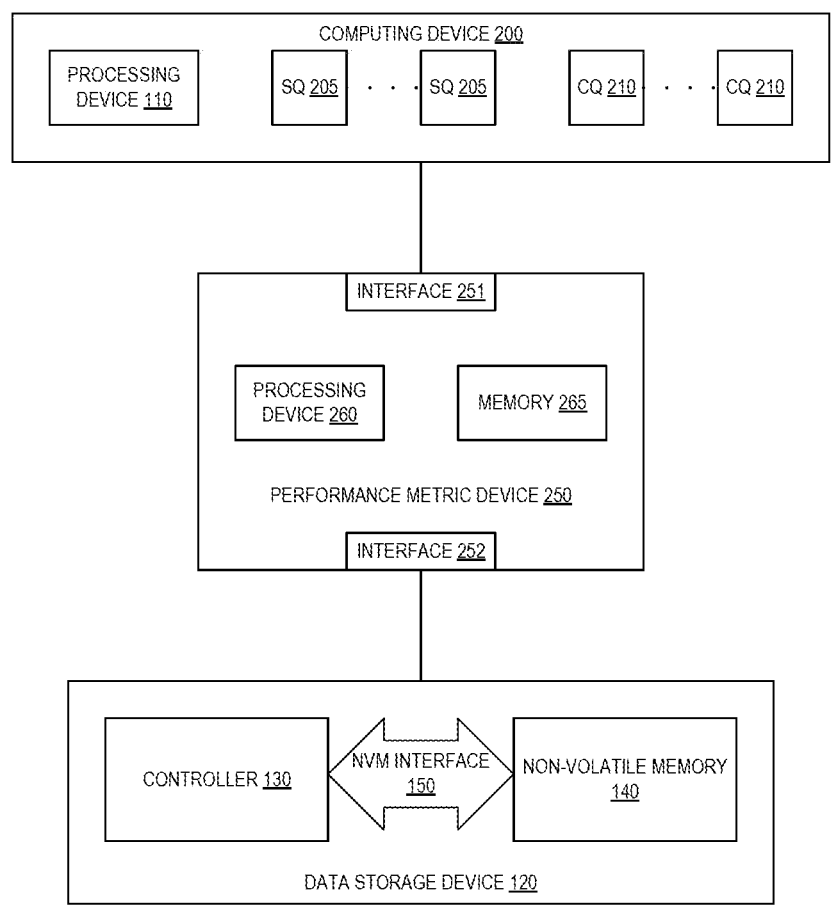
FIG. 2 is a block diagram illustrating an example computing device, in accordance with one or more embodiments of the present disclosure.

FIG. 2 is a diagram illustrating an example computing device 200, in accordance with some embodiments of the present disclosure. The computing device 200 includes a processing device 110, a random access memory (RAM) 115, submission queues (SQs) 205, and completion queues (CQs) 210. The computing device 200 may be a device that may execute services, processes, applications, apps, instructions, etc., to perform one or more operations. For example, the computing device 200 may be server computer, a desktop computer, etc. The computing device 200 may be coupled to one or more networks and/or other computing devices via the one or more networks, as discussed in more detail below. Although the data storage device 120 is illustrated as separate from of the computing device 200 (e.g., may be located outside of a housing, chassis, case, slot, etc., of the computing device 200), in other embodiments, the data storage device 120 may be included as part of the computing device 200 (e.g., may be located outside of a housing, chassis, case, slot, etc., of the computing device 200).

In one embodiment, the data storage device 120 may be any type of data storage device, drive, module, component, system, or the like, that is configured to read data, write data, store data, and/or allow access to the data. For example, the data storage device 120 may be solid state disk drive (SSD), a disk drive, a flash drive, a flash disk, a secure digital (SD) card, a miniSD card, a microSD card, a compact flash (CF) card, a multimedia card (MMC), an eXtreme digital (xD) card, a thumb drive, a USB drive, a stick drive, a USB stick, etc. As shown, the data storage device 120 includes a controller 130 (e.g., control circuitry, software, firmware, or a combination thereof) and a non-volatile memory 140. The controller 130 may be coupled to a non-volatile memory 140 via a memory interface 150. The controller 130 may be hardware, software, firmware, or a combination thereof, that is configured to perform one or more computational operations.

The non-volatile memory (NVM) 140 may be configured for long-term storage of data and may retain data between power on/off cycles of the data storage device 120. In some embodiments, the non-volatile memory 140 may include any combination of solid-state memory, magnetic media, optical disks, floppy disks, electrically programmable read only memories (EPROM), electrically erasable programmable read only memories (EEPROM), etc. The non-volatile memory 140 may be divided logically and/or physically into cells, dies, arrays, planes, blocks, pages, tracks, and sectors.

The controller 130 may include one or more processors, memory devices, data and/or power transmission channels/paths, boards, or the like. The controller 130 may be implemented as one or more SoC modules, FPGA modules, ASIC modules, processors, or the like. The controller 130 may be configured to receive data commands from a storage residing on the computing device 200. The controller 130 may communicate with the computing device 200 over a host interface 160, and may receive commands via the host interface 160. These commands may be referred to as data commands, storage commands, data access commands, data storage access commands, etc. Data may be accessed/transferred based on such data commands. The data storage device 120 may store data received from the computing device 200 such that the data storage device 120 acts as data storage for the computing device 200. The controller 130 may implement a logical interface that may present the non-volatile memory 140 as a set of logical addresses where data may be stored. Internally, the controller 130 may map logical addresses to various physical memory addresses in the non-volatile memory 140.

In one embodiment, the data storage device 120 may lack an internal power source. For example, the data storage device 120 may not include a battery that may be used to operate (e.g., to power) one or more of the controller 130, the memory interface 150, and the non-volatile memory 140. The data storage device 120 may receive power to operate from the computing device 200. For example, the data storage device 120 may receive power to operate one or more of the controller 130, the memory interface 150, and the non-volatile memory 140 from the computing device via the host interface 160.

As illustrated in FIG. 2, the computing device 200 may be coupled to the data storage device 220 via a performance metric device 250 (e.g., the performance metric device 250 is between the computing device 200 and the data storage device 120). The performance metric device 250 includes a processing device 260 (e.g., a processor, an FPGA, an ASIC, a SoC, etc.) and a memory 265. The memory 265 may be a combination of volatile memory (e.g., RAM, cache, etc.) and/or non-volatile memory (e.g., flash memory, magnetic memory, etc.). The processing device 260 may be coupled to the memory 265. The performance metric device 250 also includes an interface 251 and an interface 252. The data storage device 120 may be coupled to the computing device 200 via a performance metric device 250. For example, the computing device 200 may be coupled to the interface 251 (of the performance metric device 250) and the data storage device 120 may be coupled to the interface 252 (of the performance metric device 250). The interfaces 251 and 252 include various types of interfaces such as PCIe interfaces, NVMe interfaces, SATA interfaces, etc.). The interfaces 251 and 252 may be of the same type or may be of different types.

In one embodiment, the performance metric device 250 (e.g., the processing device 260) may communicate (e.g., forward, transmit, receive, etc.) data (e.g., messages, packets, frames, requests, responses, etc.) between the data storage device. For example, the performance metric device 250 may receive packets, such as transaction layer packets (e.g., TLPs or TLP packets), from the computing device 200. The performance metric device 250 may analyze and/or may optionally decode the packets (e.g., TLP packets) to determine the contents of the packets (e.g., the data in the payload, values/fields in the packet headers, etc.). The performance metric device 250 may forward the packets to the data storage device 120 and/or may optionally encode the packets. In another example, the performance metric device 250 may receive packets (e.g., TLP packets), from the data storage device 120. The performance metric device 250 may analyze and/or may optionally decode the packets (e.g., TLP packets) to determine the contents of the packets (e.g., the data in the payload, values/fields in the packet headers, etc.). The performance metric device 250 may forward the packets to the computing device 200 and/or may optionally encode the packets. Although the present disclosure may refer to TLP packets, other types of packets, messages, and/or frames may be used in other embodiments. The packets communicated (e.g., forwarded, transmitted, routed, etc.) by the performance metric device 250 may be commands (e.g., access commands) that allow the computing device 200 to access (e.g., read, write, etc.) data stored on the data storage device 120 (e.g., stored in the non-volatile memory 140). The commands may also instruct the data storage device to perform various operations (e.g., transition to a power state). The packets may also include results of the commands (e.g., success, fail, etc.) The packets may also include data that is read from the data storage device 120 and/or that should be written to the data storage device 120.

In one embodiment, the performance metric device 250 (e.g., the processing device 260) may determine, measure, calculate, etc., one or more performance metrics of the data storage device 120, as discussed in more detail below. For example, the performance metric device 250 may measure the latency for the data storage device 120 to perform one or more commands (e.g., access commands, data commands, data access commands, etc.). In another example, the performance metric device 250 may measure the throughput (e.g., data throughput) of the data storage device 120. In a further example, the performance metric device 250 may measure the power consumption/usage of the data storage device 120.

In one embodiment, the performance metric device 250 (e.g., processing device 260) may receive a request to measure (e.g., test, obtain, determine calculate, evaluate, etc.) one or more performance metrics (e.g., a set of performance metrics) from the computing device 200. For example, a user of the computing device 200 may submit, transmit, send, etc., a request to measure one or more performance metrics (e.g., latency, throughput, power usage/consumption, etc.) via a user interface (e.g., a graphical user interface (GUI), a command line interface (CLI), etc.) provided/displayed by the computing device 200. The computing device may provide or transmit the request (to measure one or more performance metrics) to the performance metric device 250.

In one embodiment, the request to measure one or more performance metrics may include data (or other information) indicating and/or identifying which performance metrics should be measured. For example, the request may indicate that the latency for executing a command should be measured. In another example, the request may indicate that the data throughput (e.g., read and/or write throughput) should be measured. The request may also indicate and/or identify multiple different types of performance metrics. For example, the request may indicate that the latency for executing one or more commands and the data throughput while should be measured.

In one embodiment, the request to measure one or more performance metrics may include data (or other information) indicating and/or identifying one or more queues (e.g., a set of queues) on the computing device 200 which are associated with one or more commands (e.g., a set of commands, a set of data commands, a set of access commands, etc.). The one or more commands may be used to measure the one or more performance metrics of the data storage device 120 when the data storage device 120 performs the one or more commands. The one or more queues one the computing device 200 (e.g., SQs 205 and CQs 210) may be used by the computing device 200 and/or the data storage device 120 to execute the one or more commands and/or provide the results of the one or more commands, as discussed in more detail below.

In one embodiment, the computing device 200 (e.g., the processing device 110) and/or the data storage device 120 may use an SQ 205 and a CQ 210 to measure the one or more performance metrics (e.g., a set of performance metrics) for the data storage device. For example, the computing device 200 may store the one or more commands on a SQ 205. The data storage device 120 may retrieve the one or more commands from the SQ 205 to execute the one or more commands and may execute the one or more commands. After executing (e.g., performing, completing, etc.) the one or more commands, the data storage device 120 may store (e.g., write) one or more results (e.g., a set of results) of the one or more commands in the CQ 210.

In one embodiment, the computing device 200 may provide the data storage device 120 with data that identifies and/or indicates one or more SQs 205 and/or one or more CQs 210. For example, the computing device 200 may transmit the memory addresses (e.g., the DMA addresses) an SQ 205 and a CQ 210 to the data storage device 120. In another example, the computing device 200 may transmit identifiers (e.g., alphanumeric values) for the SQ 205 and the CQ 210. The data indicating and/or identifying the SQs 205 and/or CQs 210 may be included in the request to measure one or more performance metrics for the data storage device. The data indicating and/or identifying the SQs 205 and/or CQs 210 may also be transmitted to the data storage device via a separate message. The data that indicates and/or identifies one or more SQs 205 and CQs 210 may also include a length and/or amount of data to read from an SQ 205. For example, the data may indicate that 64 bytes (e.g., the size/length of one command), 128 bytes (e.g., the size/length of two commands), or some other appropriate size/length of data should read from the SQ 205. Because the performance metric device 250 is located between the computing device 200 and the data storage device 120, the performance metric device 250 may receive the data that indicates and/or identifies the one or more SQs 205 and CQs 210 and may forward that data to the data storage device 120.

In one embodiment, the performance metric device 250 (e.g., processing device 260) may identify one or more commands that are used to measure the one or more performance metrics for the data storage device. For example, the computing device 200 may add the one or more commands to a SQ 205 and may transmit a message, signal, or other data to the data storage device indicating that the one or more commands are in the SQ 205. Transmitting the message indicating that the one or more commands are in the SQ 205 may be referred to as ringing the doorbell. The data storage device 120 may send a message (e.g., a TLP packet, a request, etc.) to retrieve the one or more commands from the SQ 205. The computing device 200 may transmit one or more messages (e.g., one or more responses, one or more TLP packets) that include the one or more commands from the SQ 205 to the data storage device 120. Because the performance metric device 250 is between the data storage device 120 and the computing device 200, the performance metric device 250 may receive the commands transmitted by the computing device 200 to the data storage device 120. The performance metric device 250 may analyze and/or decode the commands and may determine command identifiers for the commands (e.g., an identifier, a number, an alphanumeric value, etc., that may be used to identify a command). The command identifiers may allow the performance metric device 250 to track or determine whether the commands have been completed, performed, executed, finished, etc., as discuss in more detail below. For example, the performance metric device 250 may store the command identifiers in the memory 265 so that the performance metric device can track, determine, etc., whether a command has been completed. The performance metric device 250 may forward the messages (e.g., the responses, the TLP packets, etc.) that include the commands, to the data storage device 120.

In one embodiment, the performance metric device 250 (e.g., processing device 260) may monitor, analyze, snoop, sniff, listen in on, etc., the messages (e.g., TLP packets and/or other data) that are communicated between the computing device 200 and the data storage device 120. This may allow the performance metric device to determine whether the commands transmitted to the data storage device have been completed and when the commands were completed. For example, the processing device 260 may be an FPGA that may decode, analyze, encode, and forward messages (e.g., TLP packets). Thus, the performance metric device 250 may be referred to as a sniffer/snooper (e.g., a PCIe sniffer/snooper).

In one embodiment, the performance metric device 250 (e.g., processing device 260) may determine whether one or more commands (used to measure one or more performance metrics) have been performed by the data storage device 120 (e.g., have been finished, executed, performed, completed, etc.). As discussed above, the data storage device 120 may receive the one or more commands from the computing device 200 via the performance metric device 250. The data storage device 120 may perform the one or more commands and may transmit one or more messages (e.g., one or more TLP packets) to the computing device 200 to indicate the status of the one or more commands. For example, the data storage device 120 may transmit a TLP packet indicating that one or more commands have been completed (e.g., executed, performed, finished, etc.) and/or indicating the results of the one or more commands. The TLP packet may also include command identifiers for the one or more command that have been completed. Because the performance metric device 250 is between the data storage device 120 and the computing device 200, the performance metric device 250 may receive the messages (e.g., TLP packets with the command identifiers and/or results of the commands) transmitted by the data storage device 120 to the computing device 200. The performance metric device 250 may analyze and/or decode the commands and may determine command identifiers for the commands that have been completed. The performance metric device 250 may determine whether the command identifiers from the messages indicating that one or more commands have been completed (e.g., a first set of command identifiers), match command identifiers that are stored in the memory 265 (e.g., a second set of command identifiers that were previously stored when the commands were provided to the data storage device for execution). If the sets of command identifiers match, the performance metric device 250 may determine that the commands have been completed. The performance metric device 250 may forward the messages (e.g., the responses indicating that one or more commands have been completed, the TLP packets, etc.) that include the commands, to the computing device 200. The computing device 200 may receive the messages indicating that the one or more commands have been completed and may store, insert, put, etc., the messages onto a CQ 210 that corresponds and/or is associated with the SQ 205 where the commands were obtained from.

In one embodiment, if the performance metric device 250 (e.g., the processing device 260) determines that one or more commands (which are used to measure one or more performance metrics of the data storage device 120) have been performed (e.g., completed, finished, executed, etc.) by the data storage device 120, the performing metric device 250 may determine the performance metrics based on the results of the one or more commands. For example, the performance metric device 250 may determine the latency to execute a command, the data throughput of the data storage device 120, the power usage/consumption of the data storage device 120, etc., after receiving a message indicating that a command has been performed (e.g., a response message, a TLP packet, etc.). Example performance metrics are discussed in more detail below.

In one embodiment, the performance metric device 250 (e.g., processing device 260) may transmit the performance metrics to the computing device 200. For example, the performance metric device 250 may transmit one or more messages that include the performance metrics (e.g., includes the values of the performance metrics, the latency, the data throughput, the power usage/consumption, etc.). In another embodiment, the performance metric device 250 may determine whether one or more performance metrics satisfy one or more thresholds (e.g., threshold values). If the performance metrics do not satisfy the one or more thresholds, the performance metric device 250 may transmit a message to the computing device 200 to indicate that the one or more performance metrics do not satisfy the one or more thresholds. For example, the performance metric device 250 may determine whether the latency to execute a command (e.g., the time to execute the command) is greater than a threshold latency. If the latency is greater than a threshold latency (e.g., does not satisfy the threshold latency), the performance metric device 250 may transmit a message indicating that the latency is greater than the threshold latency. In another example, the performance metric device 250 may determine whether the data throughout (e.g., read and/or write throughput) is less than a threshold throughput.

In one embodiment, one performance metric (e.g., one type of performance metric) that may be measured by the performance metric device 250 (e.g., processing device 260) may be one or more latencies for executing one or more commands (e.g., commands used to measure the latency or performance metric). The computing device 200 may create and/or use a SQ 205 and a CQ 210 (e.g., a corresponding CQ 210) for testing the latency of one or more commands. The computing device 200 may send a message to the performance metric device 250 indicating the addresses (e.g., a memory address, an address range, etc.) and/or identifiers of the SQ 205 and the CQ 210 and the number of commands to obtain from the SQ 205 (e.g., the length of amount of data to read from the SQ 205). The performance metric device 250 may store the addresses (e.g., memory addresses, DMA addresses, etc.) of the SQ 205 and the CQ 210. The computing device 200 may transmit a message to the data storage device 120 (e.g., may ring the doorbell) to indicate that there are one or more commands for the data storage device 120 to perform, execute, etc. The data storage device 120 may request the one or more commands from the computing device 200 (e.g., may request to read and/or retrieve the one or more commands from the SQ 205). The request may be included in a TLP packet and the TLP packet may include a tag identifier to identify the request.

The computing device 200 may respond by transmitting another message (e.g., a TLP packet) that includes the requested one or more commands. The performance metric device 250 may determine whether the messages being communicated between the data storage device 120 and the computing device 200 use and/or are addressed to the SQ 205. For example, the performance metric device 250 may analyze each message (e.g., may sniff/snoop each TLP packet) and may determine whether the message indicates and/or references the memory address and/or an address range (e.g., a range of memory address) for the SQ 205 (e.g., whether the message is requesting access to a particular SQ 205). This may allow the performance metric device 250 to identify the messages (e.g., TLP packets) that are associated with the one or more commands that are used to measure the latency. The performance metric device 250 may determine that one of the messages is the response to request for the one or more commands. The message (e.g., the response or TLP packet with the requested commands) may include the same tag identifier that was in the request from the data storage device 120 for the one or more commands. The performance metric device 250 may determine that the two tag identifiers (e.g., the first tag identifier from the request for the commands and the second tag identifier from the response) match. This may allow the performance metric device 250 to determine that the one or more commands in the response from the computing device 200 are the commands that will be used to measure the latency of the data storage device 120. The performance metric device 250 may analyze the response (e.g., one or more TLP packets) and may determine the command identifiers for the one or more commands.

The performance metric device 250 may forward the messages to the data storage device 120 so that the data storage device 120 may execute the commands. The performance metric device 250 may also start a timer that may be used to measure the latency of the data storage device 120 when the one or more commands are forwarded to the data storage device 120. One timer may be used for multiple commands or multiple timers may be used for the multiple commands (e.g., one timer for each command). The data storage device 120 may receive the one or more commands for measuring the latency of the data storage device 120 and may execute (e.g., perform, execute, etc.) the one or more commands. When the data storage device 120 completes, performs, executes, etc., the one or more commands, the data storage device 120 may transmit a message (e.g., a TLP packet) to the computing device 200 indicating that the one or more commands have been completed and/or indicating the results of the one or more commands (e.g., success, pass, fail, error, etc.). The performance metric device 250 may determine whether the message indicates and/or references the memory address and/or an address range (e.g., a range of memory address) for the CQ 210 (e.g., whether the message is requesting access to a particular CQ 210). If the message indicates or references the CQ 210 and/or an address of the CQ 210 (which was previously indicated by the computing device 200), the performance metric device 250 may determine that the message should be analyzed to determine the command identifiers included in the message. The performance metric device 250 may determine whether the command identifiers from the message from the data storage device 120 to the computing device 200 indicating that the one or more commands have been completed, match command identifiers that are stored in the memory 265 (e.g., a second set of command identifiers that were previously stored when the commands were provided to the data storage device 120 for execution). If the command identifiers match, the performance metric device 250 may determine that the one or more commands for testing the latency of the data storage device 120 have been complete and may stop the timer. The performance metric device 250 may determine the latency (e.g., time) to execute the one or more commands based on the timer. For example, the performance metric device 250 may determine the difference between the start time and end time of the timer.

In one embodiment, one performance metric (e.g., one type of performance metric) that may be measured by the performance metric device 250 (e.g., processing device 260) may be the data throughput of the data storage device 120. The data throughput may include the read throughput (e.g., the amount of data read from the data storage device 120 during a period of time) and/or a write throughput (e.g., the amount of data written to the data storage device during the period of time). The computing device 200 may create and/or use a SQ 205 and a CQ 210 (e.g., a corresponding CQ 210) for testing the latency of one or more commands. The computing device 200 may send a message to the performance metric device 250 indicating the addresses (e.g., a memory address, an address range, etc.) and/or identifiers of the SQ 205 and the CQ 210 and the number of commands to obtain from the SQ 205 (e.g., the length of amount of data to read from the SQ 205). The performance metric device 250 may store the addresses (e.g., memory addresses, DMA addresses, etc.) of the SQ 205 and the CQ 210. The computing device 200 may transmit a message to the data storage device 120 (e.g., may ring the doorbell) to indicate that there are one or more commands for the data storage device 120 to perform, execute, etc. The one or more commands may instruct the data storage device 120 read and/or write data to the data storage device 120. The data storage device 120 may request the one or more commands from the computing device 200 (e.g., may request to read and/or retrieve the one or more commands from the SQ 205). The request may be included in a TLP packet and the TLP packet may include a tag identifier to identify the request.

The computing device 200 may respond by transmitting another message (e.g., a TLP packet) that includes the requested one or more commands. The one or more commands may transfer (e.g., communicate data) between the computing device and the data storage device 120 (e.g., read data from the data storage device 120, write data to the data storage device, etc.). For example, a first command may instruct the data storage device 120 to read a 200 megabyte (MB) file and a second command may instruct the data storage device 120 to write a 350 MB file to non-volatile memory 140. The commands may include any combination of read and write commands (e.g., may include three read commands and five commands). The performance metric device 250 may determine whether the messages being communicated between the data storage device 120 and the computing device 200 use and/or are addressed to the SQ 205. For example, the performance metric device 250 may analyze each message (e.g., may sniff/snoop each TLP packet) and may determine whether the message indicates and/or references the memory address and/or an address range (e.g., a range of memory address) for the SQ 205 (e.g., whether the message is requesting access to a particular SQ 205). This may allow the performance metric device 250 to identify the messages (e.g., TLP packets) that are associated with the one or more commands that are used to measure the latency. The performance metric device 250 may determine that one of the messages is the response to request for the one or more commands. The message (e.g., the response or TLP packet with the requested commands) may include the same tag identifier that was in the request from the data storage device 120 for the one or more commands. The performance metric device 250 may determine that the two tag identifiers (e.g., the first tag identifier from the request for the commands and the second tag identifier from the response) match. This may allow the performance metric device 250 to determine that the one or more commands in the response from the computing device 200 are the commands that will be used to measure the latency of the data storage device 120. The performance metric device 250 may analyze the response (e.g., one or more TLP packets) and may determine the command identifiers for the one or more commands.

The performance metric device 250 may forward the messages to the data storage device 120 so that the data storage device 120 may execute the commands. The performance metric device 250 may also start one or more timers that may be used to measure the data throughput of the data storage device 120 when the data storage device 120 executes the one or more commands. The one or more timers may be used to determine the data throughput of the data storage device, as discussed in more detail below. The data storage device 120 may receive the one or more commands for measuring the latency of the data storage device 120 and may execute (e.g., perform, execute, etc.) the one or more commands. When the data storage device 120 completes, performs, executes, etc., the one or more commands, the data storage device 120 may transmit a message (e.g., a TLP packet) to the computing device 200 indicating that the one or more commands have been completed and/or indicating the results of the one or more commands (e.g., success, pass, fail, error, etc.). The performance metric device 250 may determine whether the message indicates and/or references the memory address and/or an address range (e.g., a range of memory address) for the CQ 210 (e.g., whether the message is requesting access to a particular CQ 210). If the message indicates or references the CQ 210 and/or an address of the CQ 210 (which was previously indicated by the computing device 200), the performance metric device 250 may determine that the message should be analyzed to determine the command identifiers included in the message. The performance metric device 250 may determine whether the command identifiers from the message from the data storage device 120 to the computing device 200 indicating that the one or more commands have been completed, match command identifiers that are stored in the memory 265 (e.g., a second set of command identifiers that were previously stored when the commands were provided to the data storage device 120 for execution).

If the command identifiers match, the performance metric device 250 may stop one or more of the timers to determine the data throughput of the data storage device 120. In one embodiment, one timer may be used for multiple commands (e.g., multiple read and/or write commands). For example, the performance metric device 250 may start one timer and as the data storage device 120 begins reading and/or writing multiple pieces/portions of data (e.g., multiple files). After all of the commands (e.g., read commands and/or write commands) are completed, the performance metric device 250 may stop the timer and determine the data throughput based on the elapsed time (e.g., the difference in time between the start of the timer and the end of the timer). In another embodiment, multiple timers may be used for the multiple commands (e.g., one timer for each command). For example, the performance metric device 250 may start one timer for each command that reads and/or writes pieces/portions of data (e.g., multiple files) to and from the data storage device. As each command is completed, the performance metric device 250 may stop the timer that corresponds to the completed command. The performance metric device 250 may determine a data throughput for the completed command and may store that data throughput in the memory 265 (e.g., determine the data throughout for a command based on the difference in time between the start of the associated timer and the end of the associated timer). In another embodiment, multiple timers may be used for the multiple commands (e.g., one timer for each command). After all of the commands have been completed or performed, the performance metric device 250 may determine overall data throughput (e.g., overall read throughput and/or overall write throughput) based on the separate data throughputs from each command. For example, the performance metric device 250 may take a weighted average of the different throughputs for the different commands.

In one embodiment, one performance metric (e.g., one type of performance metric) that may be measured by the performance metric device 250 (e.g., processing device 260) may be the power usage of the data storage device 120. The computing device 200 may create and/or use a SQ 205 and a CQ 210 (e.g., a corresponding CQ 210) for testing the latency of one or more commands. The computing device 200 may send a message to the performance metric device 250 indicating the addresses (e.g., a memory address, an address range, etc.) and/or identifiers of the SQ 205 and the CQ 210 and the number of commands to obtain from the SQ 205 (e.g., the length of amount of data to read from the SQ 205). The performance metric device 250 may store the addresses (e.g., memory addresses, DMA addresses, etc.) of the SQ 205 and the CQ 210. The computing device 200 may transmit a message to the data storage device 120 (e.g., may ring the doorbell) to indicate that there are one or more commands for the data storage device 120 to perform, execute, etc. The one or more commands may instruct the data storage device 120 to transition to different power states (e.g., from an active power state to a sleep state). The data storage device 120 may request the one or more commands from the computing device 200 (e.g., may request to read and/or retrieve the one or more commands from the SQ 205). The request may be included in a TLP packet and the TLP packet may include a tag identifier to identify the request.

The computing device 200 may respond by transmitting another message (e.g., a TLP packet) that includes the requested one or more commands. The performance metric device 250 may determine whether the messages being communicated between the data storage device 120 and the computing device 200 use and/or are addressed to the SQ 205. For example, the performance metric device 250 may analyze each message (e.g., may sniff/snoop each TLP packet) and may determine whether the message indicates and/or references the memory address and/or an address range (e.g., a range of memory address) for the SQ 205 (e.g., whether the message is requesting access to a particular SQ 205). This may allow the performance metric device 250 to identify the messages (e.g., TLP packets) that are associated with the one or more commands that are used to measure the latency. The performance metric device 250 may determine that one of the messages is the response to request for the one or more commands. The message (e.g., the response or TLP packet with the requested commands) may include the same tag identifier that was in the request from the data storage device 120 for the one or more commands. The performance metric device 250 may determine that the two tag identifiers (e.g., the first tag identifier from the request for the commands and the second tag identifier from the response) match. This may allow the performance metric device 250 to determine that the one or more commands in the response from the computing device 200 are the commands that will be used to measure the latency of the data storage device 120. The performance metric device 250 may analyze the response (e.g., one or more TLP packets) and may determine the command identifiers for the one or more commands.

The performance metric device 250 may forward the messages to the data storage device 120 so that the data storage device 120 may execute the commands. The performance metric device 250 may also begin to monitor the power usage/consumption of the data storage device 120. For example, the performance metric device 250 may continuously monitor the amount of power used by the data storage device 120 (e.g., measure the amount of power used every 10 milliseconds (ms), every 50 ms, every second, etc.). The data storage device 120 may receive the one or more commands and may execute (e.g., perform, execute, etc.) the one or more commands. The one or more commands may transition the data storage device to different power states. For example, a first command may transition the data storage device 120 from an active power state to a lower power state (e.g., a power state that users less power than the active power state). A second command may transition the data storage device 120 from the lower power state to the lowest power state (E.g., the power state that uses the least amount of power). While the different commands are executed and while the data storage device 120 is transitioning between the different power states, the performance metric device 250 may be continuously monitoring and/or recording the power usage of the data storage device 120 in the memory 265. In one embodiment, the data storage device 120 may wait for a period of time before transitioning from one power state to another. For example, after transitioning from a first power state to a second power state, the data storage device 120 may wait for a period of time (e.g., 10 seconds, 30 seconds, or some other appropriate period of time) before transitioning the data storage device to a third power state. This period of time may be included as part of the commands and/or may be indicated in a separate command.

When the data storage device 120 completes, performs, executes, etc., the one or more commands (to transition the data storage device 120 to different power states), the data storage device 120 may transmit a message (e.g., a TLP packet) to the computing device 200 indicating that the one or more commands have been completed and/or indicating the results of the one or more commands (e.g., success, pass, fail, error, etc.). The performance metric device 250 may determine whether the message indicates and/or references the memory address and/or an address range (e.g., a range of memory address) for the CQ 210 (e.g., whether the message is requesting access to a particular CQ 210). If the message indicates or references the CQ 210 and/or an address of the CQ 210 (which was previously indicated by the computing device 200), the performance metric device 250 may determine that the message should be analyzed to determine the command identifiers included in the message. The performance metric device 250 may determine whether the command identifiers from the message from the data storage device 120 to the computing device 200 indicating that the one or more commands have been completed, match command identifiers that are stored in the memory 265 (e.g., a second set of command identifiers that were previously stored when the commands were provided to the data storage device 120 for execution).

If the command identifiers match, the performance metric device 250 may determine the power usage of the data storage device 120 based on the continuously recorded power usage. This may allow the performance metric device 250 to determine whether the data storage device 120 uses the appropriate amount of power in a given power state (e.g., whether the power usage is below a threshold usage or within a range). This may also allow the performance metric device 250 to determine the amount of time it takes for the data storage device to transition between different power states (e.g., how long it takes the data storage device 120 to transition to from an active power state to a sleep power state and vice versa).

As discussed above, analyzers, oscilloscopes, bus tracers, and/or tools that may be used to analyze the performance of the data storage device (e.g., to determine one or more performance metrics of the data storage device) are often expensive and may not operate with all different types of data storage device. Driver level timestamps may not have good timing accuracy/resolution when measuring the performance metrics. The embodiments, implementations, examples, etc., disclosed herein may be able to obtain performance metrics with a higher degree of timing accuracy/resolution and at a lower cost. For example, the performance metric device 250 may be a sniffer/snooper (e.g., a PCIe sniffer/snooper), etc., that is able to decode, analyze, encode, and/or forward packets within microseconds. This allows the performance metric device 250 to determine when the data storage device started execution of commands and when the data storage device completed the commands at a microsecond level (e.g., within 2, 5, or 10 microseconds). This allows the performance metric device 250 to measure latency, data throughput, power consumption, at a higher degree of timing accuracy/resolution than analyzers, oscilloscopes, bus tracers, tools, and device drivers. For example, rather than measuring latency, data throughput, power consumption, with a timing accuracy/resolution of milliseconds (e.g., as with driver level timestamps), the performance metric device 250 may be able to measure the latency, data throughput, power consumption with an accuracy of plus or minus a couple of microseconds.

Figure 3:
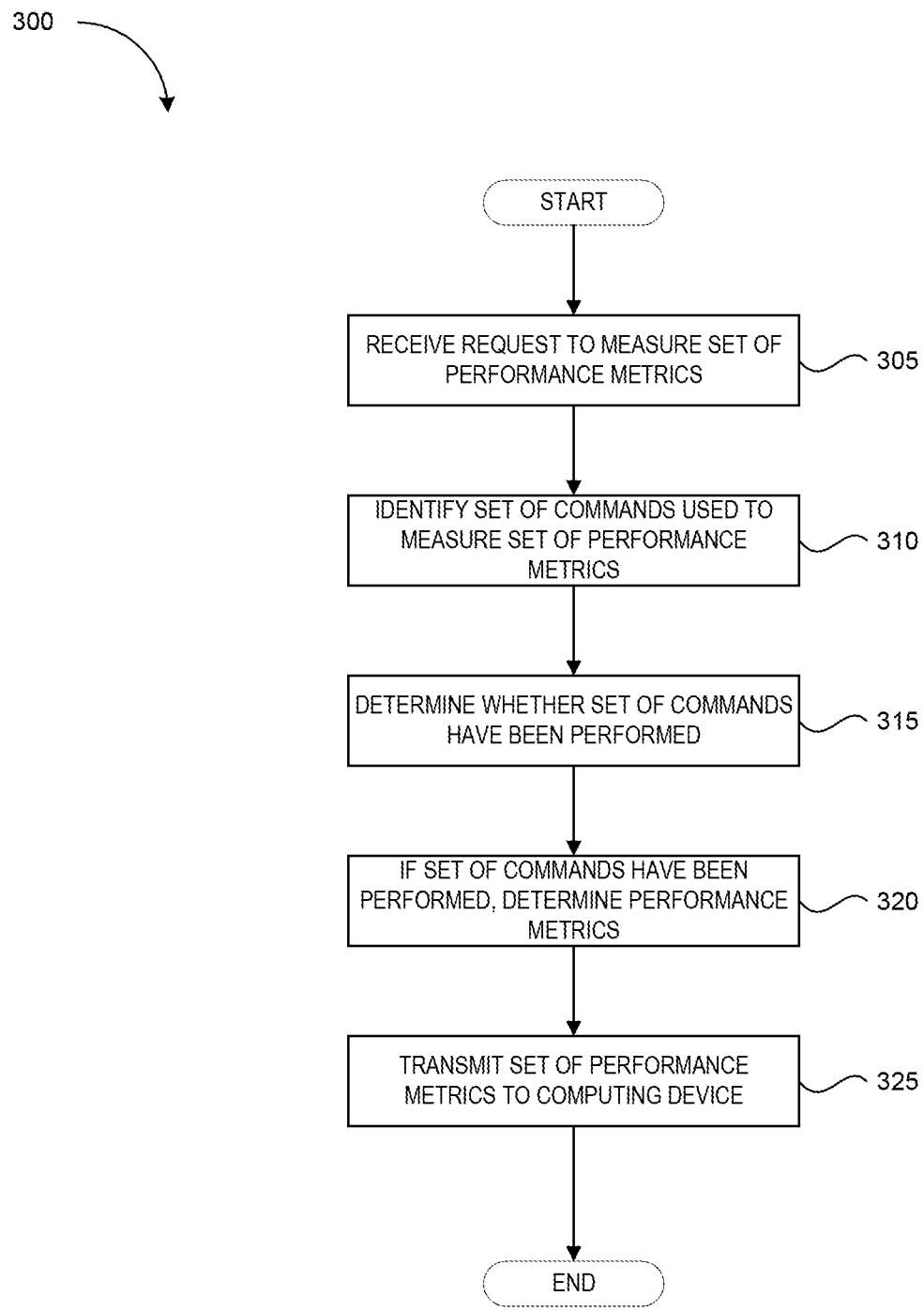
FIG. 3 is a flowchart illustrating an example a process for measuring performance metrics for a data storage device, in accordance with one or more embodiments of the present disclosure.

FIG. 3 is a flowchart illustrating an example a process 300 for measuring performance metrics for a data storage device, in accordance with one or more embodiments of the present disclosure. The process 300 may be performed by a processing device (e.g., a processor, a central processing unit (CPU), a controller, an application-specific integrated circuit (ASIC), a field programmable gate array (FPGA), etc.), a performance metric device (e.g., performance metric device 250 illustrated in FIG. 2), etc. The controller, processing device, performance metric device, etc., may be processing logic that includes hardware (e.g., circuitry, dedicated logic, programmable logic, microcode, etc.), software (e.g., instructions run on a processor to perform hardware simulation), firmware, or a combination thereof.

The process 300 begins at block 305 where the process 300 receives a request to measure a set of performance metrics. The request may identify/indicate the set of performance metrics. The request may also indicate address (e.g., DMA addresses, a range of addresses) of the one or more SQs and CQs, as discussed above. At block 310, the process 300 may identify a set of commands used to measure the set of performance metrics. For example, the process 300 may analyze messages (e.g., TLP packets) communicated between a computing device and a data storage device to determine tag identifiers and command identifiers, as discussed above. At block 315, the process 300 may determine whether the set of commands have been performed. For example, the process 300 may analyze messages (e.g., TLP packets) communicated between a computing device and a data storage device to determine whether the messages indicate that commands that have the command identifiers have been completed, performed, executed, etc., as discussed above. If the set of commands have been executed, the process 300 may determine a set of performance metrics at block 320, as discussed above. For example, the process 300 may determine the latency to execute a command. In another example, the process 300 may determine the data throughput of the data storage device 120. In a further example, the process 300 may determine the power usage of a data storage device in various power states. At block 325, the process 300 may transmit the set of performance metrics to a computing device. The process 300 may also determine whether the set of performance metrics satisfies one or more thresholds and may provide an indication (e.g., message) to the computing device when the set of performance metrics do not satisfy one or more of the thresholds.

Figure 4:
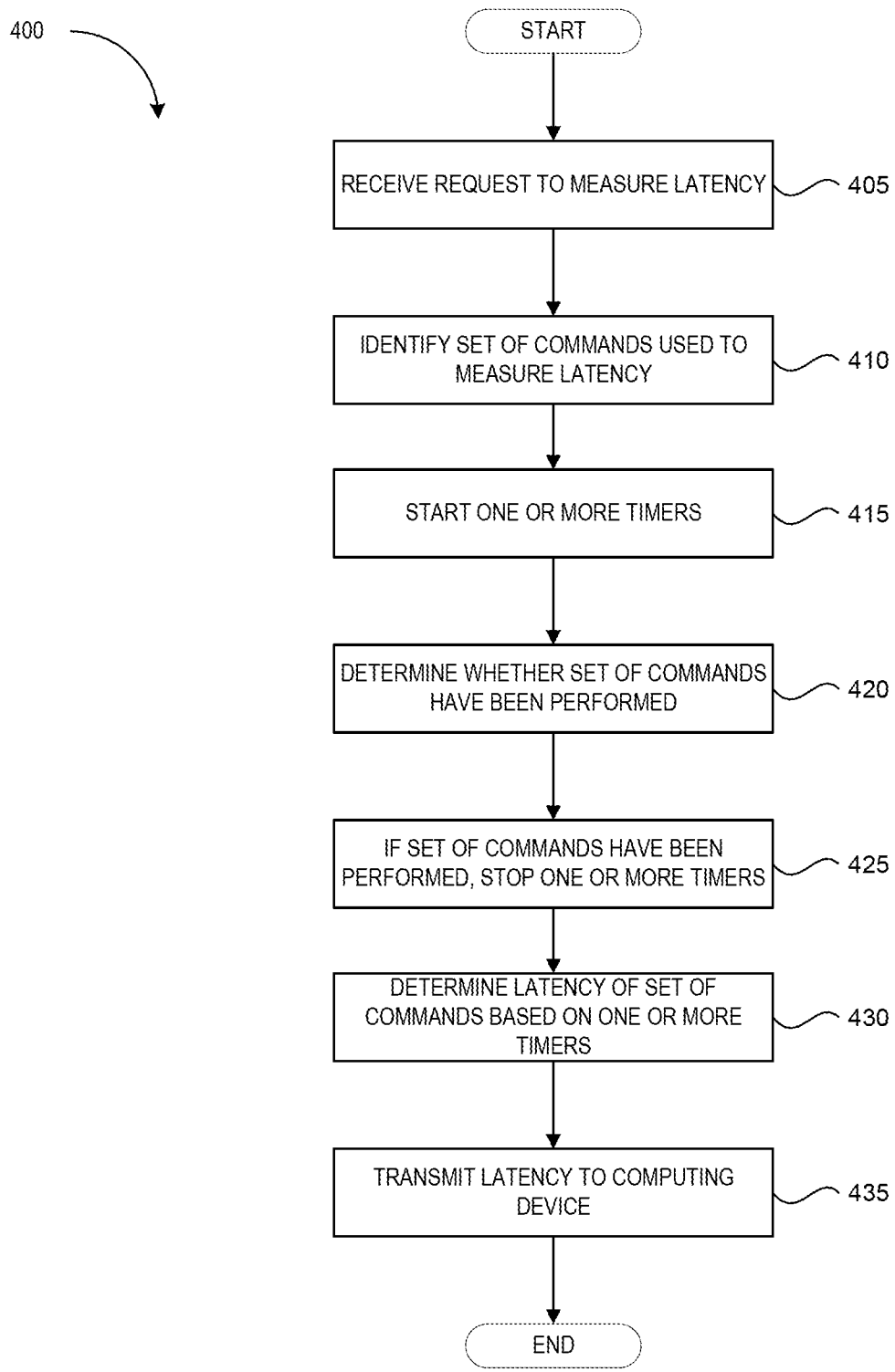
FIG. 4 is a flowchart illustrating an example a process for measuring a latency for a data storage device, in accordance with one or more embodiments of the present disclosure.

FIG. 4 is a flowchart illustrating an example a process 400 for measuring a latency for a data storage device, in accordance with one or more embodiments of the present disclosure. The process 400 may be performed by a processing device (e.g., a processor, a central processing unit (CPU), a controller, an application-specific integrated circuit (ASIC), a field programmable gate array (FPGA), etc.), a performance metric device (e.g., performance metric device 250 illustrated in FIG. 2), etc. The controller, processing device, performance metric device, etc., may be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 receives a request to measure the latency of a data storage device. The request may identify/indicate that the latency of the data storage device should be measured. The request may also indicate address (e.g., DMA addresses, a range of addresses) of the one or more SQs and CQs, as discussed above. At block 410, the process 400 may identify a set of commands used to latency of the data storage device. For example, the process 400 may analyze messages (e.g., TLP packets) communicated between a computing device and a data storage device to determine tag identifiers and command identifiers, as discussed above. The process 400 may also forward the messages to the data storage device. At block 415, the process 400 may start one or more timers (e.g., one timer for all commands, one timer for each command, etc.), as discussed above. At block 420, the process 400 may determine whether the set of commands have been performed. For example, the process 400 may analyze messages (e.g., TLP packets) communicated between a computing device and a data storage device to determine whether the messages indicate that commands that have the command identifiers have been completed, performed, executed, etc., as discussed above. If the set of commands have been executed, the process 400 may stop the one or more timers at block 425. At block 430, the process 400 may determine the latency of the data storage device when executing the set of commands based on the one or more timers (e.g., determine how long the it took the data storage device to execute the set of commands based on the start time and end time of the timer). At block 435, the process 400 may transmit the latency to a computing device. The process 400 may also determine whether the latency satisfies one or more thresholds (e.g., whether the latency is below a threshold) and may provide an indication (e.g., message) to the computing device when the latency does not satisfy one or more of the thresholds.

Figure 5:
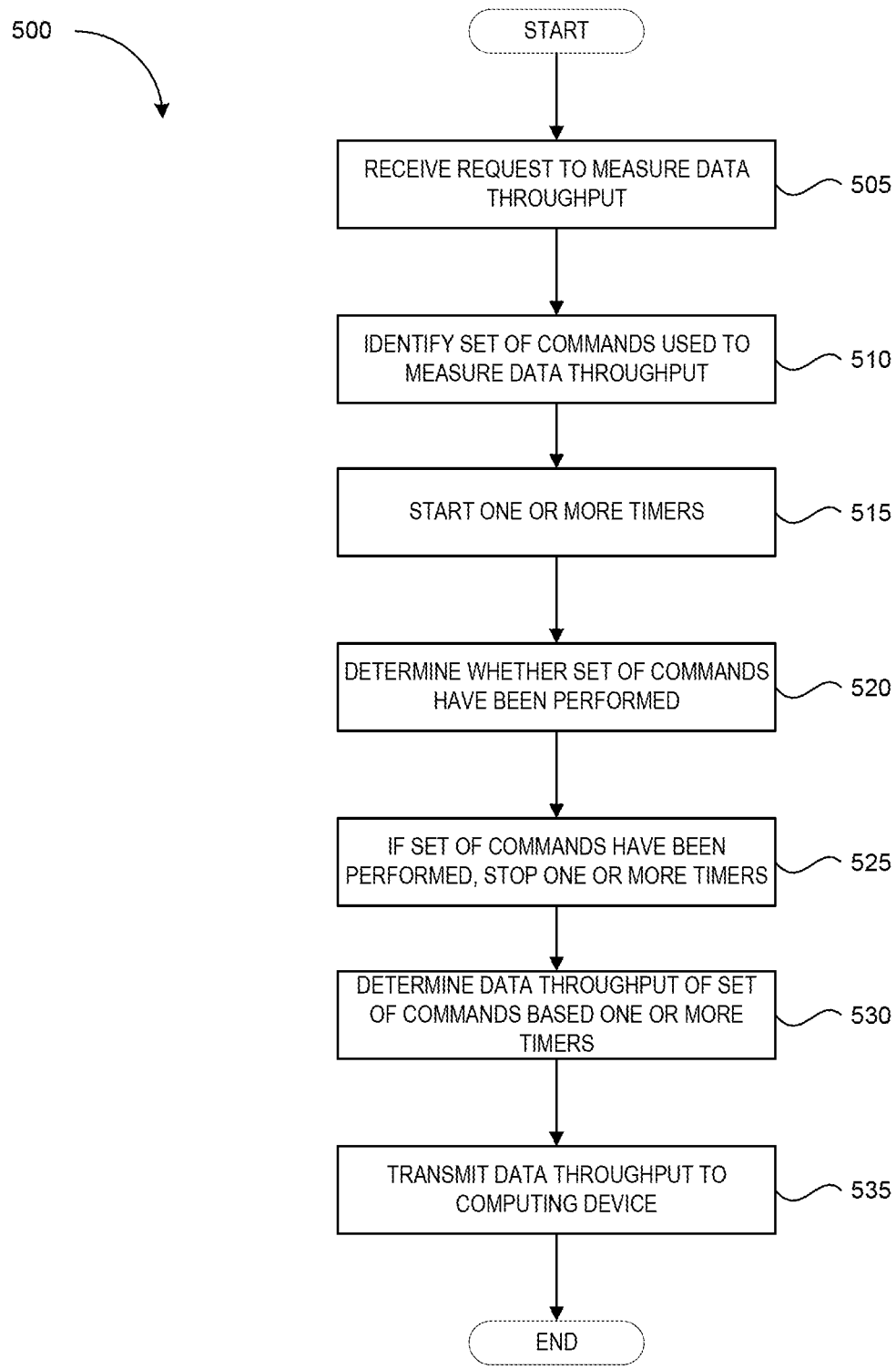
FIG. 5 is a flowchart illustrating an example a process for measuring a data throughput for a data storage device, in accordance with one or more embodiments of the present disclosure.

FIG. 5 is a flowchart illustrating an example a process 500 for measuring a data throughput for a data storage device, in accordance with one or more embodiments of the present disclosure. The process 500 may be performed by a processing device (e.g., a processor, a central processing unit (CPU), a controller, an application-specific integrated circuit (ASIC), a field programmable gate array (FPGA), etc.), a performance metric device (e.g., performance metric device 250 illustrated in FIG. 2), etc. The controller, processing device, performance metric device, etc., may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 receives a request to measure the data throughput of a data storage device. The request may identify/indicate that the data throughput of the data storage device should be measured. The request may also indicate address (e.g., DMA addresses, a range of addresses) of the one or more SQs and CQs, as discussed above. At block 510, the process 500 may identify a set of commands used to measure the data throughput. For example, the process 500 may analyze messages (e.g., TLP packets) communicated between a computing device and a data storage device to determine tag identifiers and command identifiers, as discussed above. The commands may instruct the data storage device to read and/or write data (e.g., read and/or write one or more files). The process 500 may also forward the messages to the data storage device. At block 515, the process 500 may start one or more timers (e.g., one timer for all commands, one timer for each command, etc.), as discussed above. At block 520, the process 500 may determine whether the set of commands (which read and/or write data) have been performed. For example, the process 500 may analyze messages (e.g., TLP packets) communicated between a computing device and a data storage device to determine whether the messages indicate that commands that have the command identifiers have been completed, performed, executed, etc., as discussed above. If the set of commands have been executed, the process 500 may stop the one or more timers at block 525. In one embodiment, at blocks 520 and 525, the process 500 may stop each timer when the command associated with the timer has stopped (e.g., stop a time when an associated command to read/write data has been completed), as discussed above. At block 530, the process 500 may determine the data throughput of the data storage device when executing the set of commands based on the timer (e.g., determine how long the it took the data storage read/write an amount of data based on the start time and end time of the timer). At block 535, the process 500 may transmit the data throughput (e.g., read and/or write throughput) to a computing device. The process 500 may also determine whether the data throughput satisfies one or more thresholds (e.g., whether the read and/or write throughputs are above one or more threshold throughputs) and may provide an indication (e.g., message) to the computing device when the set of data throughput does not satisfy one or more of the thresholds.

Figure 6:
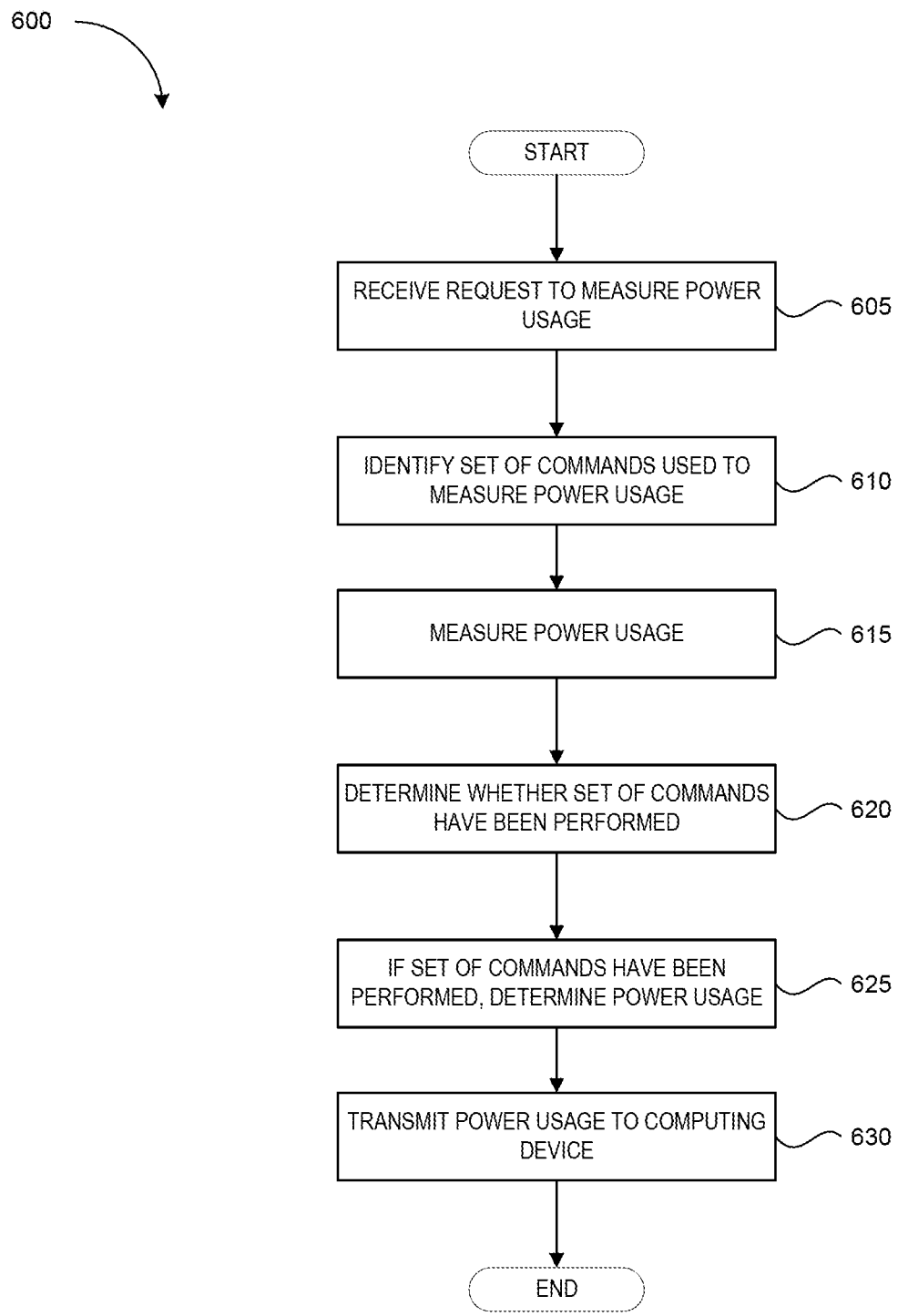
FIG. 6 is a flowchart illustrating an example a process for measuring power usage for a data storage device, in accordance with one or more embodiments of the present disclosure.

FIG. 6 is a flowchart illustrating an example a process 600 for measuring power usage for a data storage device, in accordance with one or more embodiments of the present disclosure. The process 600 may be performed by a processing device (e.g., a processor, a central processing unit (CPU), a controller, an application-specific integrated circuit (ASIC), a field programmable gate array (FPGA), etc.), a performance metric device (e.g., performance metric device 250 illustrated in FIG. 2), etc. The controller, processing device, performance metric device, etc., may be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 receives a request to measure the power consumption of a data storage device. The request may identify/indicate that the power consumption of the data storage device should be measured. The request may also indicate address (e.g., DMA addresses, a range of addresses) of the one or more SQs and CQs, as discussed above. At block 610, the process 600 may identify a set of commands used to measure the data throughput. For example, the process 600 may analyze messages (e.g., TLP packets) communicated between a computing device and a data storage device to determine tag identifiers and command identifiers, as discussed above. The commands may instruct the data storage device to transition to different power states. For example, there may be three commands and each command may instruct the data storage device to transition to a different power state. The process 600 may also forward the messages to the data storage device. At block 615, the process 600 may continuously monitor the power usage/consumption of the data storage device (e.g., periodically measure the power usage, measure the power usage every second, 100 ms, 500 ms, etc.). At block 620, the process 600 may determine whether the set of commands (which transition the data storage device to different power states) have been performed. For example, the process 600 may analyze messages (e.g., TLP packets) communicated between a computing device and a data storage device to determine whether the messages indicate that commands that have the command identifiers have been completed, performed, executed, etc., as discussed above. If the set of commands have been executed, the process 600 determine the power usage for the data storage device at block 625. For example, the process 600 may determine the amount of power used during a power state, the amount of time to transition the data storage device from one power state to another power state, etc. At block 630, the process 600 may transmit the power usage to a computing device. The process 600 may also determine whether the power usage satisfies one or more thresholds (e.g., whether the power usage is less than a threshold) and may provide an indication (e.g., message) to the computing device when the set of power usage does not satisfy one or more of the thresholds.

Analyzers, oscilloscopes, bus tracers, and/or tools that may be used to analyze the performance of the data storage device (e.g., to determine one or more performance metrics of the data storage device) are often expensive and may not operate with all different types of data storage device. In addition, devices drivers may generate logs with driver level timestamps to indicate when different operations, actions, or events occur. However, driver level timestamps may not have good timing accuracy/resolution when measuring the performance metrics. For example, a driver may not generate a log until the driver is allowed to write to the log by the computing devices (e.g., when the process executing the driver is scheduled to execute by the operating system of the computing device). This may cause delays in the driver level timestamps because an operation may be performed at one time, but may not be logged until tens or hundreds of milliseconds later.

The embodiments, implementations, examples, etc., disclosed herein may be able to obtain performance metrics with a higher degree of timing accuracy/resolution and at a lower cost. Rather than using driver level time stamps, expensive analyzers, oscilloscopes, bus tracers, and/or tools which may not have a high degree of accuracy/resolution, a performance metric device (as described herein) may decode, analyze, encode, and/or forward packets within microseconds. This allows the performance metric device to measure latency, data throughput, power consumption, at a much higher degree of timing accuracy/resolution (e.g., at a microsecond level, rather than at the level of tens or hundreds of milliseconds). In addition, the performance metric device may include commonly use components, such as FPGAs, which may reduce the cost of producing and/or using the performance metric device.

In addition, although the present disclosure may refer to a latency, data throughput, power consumption, the embodiments, implementations, and/or examples disclosed herein may be applied to other types of performance metrics.

GENERAL COMMENTS

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An apparatus, comprising:
   a first interface configured to communicate with a computing device;
   a second interface configured to communicate with a data storage device; and
   a processing device coupled to the first interface and the second interface, the processing device configured to:
      receive, from the computing device via the first interface, a request to measure a set of performance metrics for the data storage device;
      identify a set of commands used to measure the set of performance metrics for the data storage device, wherein the identified set of commands are measured at a predetermined microsecond level;
      determine whether the set of commands has been performed by the data storage device;
      in response to determining that the set of commands has been performed by the data storage device, determine the set of performance metrics based on a set of results for the set of commands, wherein the set of results comprise a degree of timing accuracy based on the identified set of commands being measured at the predetermined microsecond level; and
      transmit the set of performance metrics to the computing device.

2. The apparatus of claim 1, wherein to receive the request to measure the set of performance metrics, the processing device is further configured to:
   receive data indicating a submission queue and a completion queue associated with the set of commands.

3. The apparatus of claim 2, wherein to identify the set of commands used to measure the set of performance metrics, the processing device is further configured to:
   receive a second request to retrieve the set of commands from the submission queue;
   determine a set of tag identifiers for the set of commands based on the second request to retrieve the set of commands; and
   receive a second response comprising the set of commands from the computing device; and
   determine a first set of command identifiers based on the second response.

4. The apparatus of claim 3, wherein to determine whether the set of commands has been performed by the data storage device, the processing device is further configured to:
   receive the set of results from the data storage device;

determine whether a second set of command identifiers in the set of results for the set of commands are a match for the set of command identifiers.

5. The apparatus of claim 1, wherein the set of performance metrics comprises a first latency for a first command of the set of commands.

6. The apparatus of claim 5, wherein to determine the set of performance metrics, the processing device is further configured to:
determine a difference between a first time and a second time, wherein:
the set of commands is identified at the first time; and
the set of results for the set of commands is received at the second time.

7. The apparatus of claim 1, wherein the set of performance metrics comprises a set of data throughputs for the data storage device.

8. The apparatus of claim 7, wherein to determine the set of performance metrics, the processing device is further configured to:
determine a difference between a first time and a second time; and
determine an amount of data communicated between the computing device and the data storage device between the first time and the second time, wherein:
the set of commands is identified at the first time;
the set of commands communicate data between the computing device and the data storage device; and
the set of results for the set of commands is received at the second time.

9. The apparatus of claim 1, wherein the set of performance metrics comprises a power usage for the data storage device.

10. An apparatus, comprising:
a first interface configured to communicate with a computing device;
a second interface configured to communicate with a data storage device; and
a processing device coupled to the first interface and the second interface, the processing device configured to:
receive, from the computing device via the first interface, a request to measure a set of performance metrics for the data storage device;
identify a set of commands used to measure the set of performance metrics for the data storage device;
determine whether the set of commands has been performed by the data storage device;
in response to determining that the set of commands has been performed by the data storage device, determine the set of performance metrics based on a set of results for the set of commands; and
transmit the set of performance metrics to the computing device, wherein:
the set of performance metrics comprises a power usage for the data storage device;
the set of commands cause the data storage device to transition from a first power state to a second power state; and
the power usage for the data storage device indicates an amount of power used by the data storage device while the data storage device is in the second power state.

11. The apparatus of claim 10, wherein the request to measure the set of performance metrics for the data storage device indicates the set of performance metrics.

12. The apparatus of claim 10, wherein to transmit the set of performance metrics to the computing device, the processing device is further configured to:
determine whether a first performance metric of the set of performance metrics satisfies a threshold; and
in response to determining that the first performance metric does not satisfy the threshold, transmit message indicating that the first performance metric is below the threshold.

13. The apparatus of claim 10, wherein the processing device is further configured to:
forward the set of commands from the computing device to the data storage device;
forward the set of results of the set of commands from the data storage device to the computing device.

14. A method, comprising:
receiving, from a computing device via a first interface, a request to measure a set of performance metrics for a data storage device;
identifying a set of commands used to measure the set of performance metrics for the data storage device, wherein the identified set of commands are measured at a predetermined microsecond level;
determining whether the set of commands has been performed by the data storage device;
in response to determining that the set of commands has been performed by the data storage device, determining the set of performance metrics based on a set of results for the set of commands, wherein the set of results comprise a degree of timing accuracy based on the identified set of commands being measured at the predetermined microsecond level; and
transmitting the set of performance metrics to the computing device.

15. The method of claim 14, wherein receiving the request to measure the set of performance metrics comprises:
receiving data indicating a submission queue and a completion queue associated with the set of commands.

16. The method of claim 15, wherein the identified set of commands used to measure the set of performance metrics comprises:
receiving a second request to retrieve the set of commands from the submission queue; and
determining a set of tag identifiers for the set of commands based on the second request to retrieve the set of commands; and
receiving a second response comprising the set of commands from the computing device; and
determining a set of command identifiers based on the second response.

17. The method of claim 16, wherein determining whether the set of commands has been performed by the data storage device comprises:
receiving the set of results from the data storage device;
determining whether a second set of command identifiers in the set of results for the set of commands are a match for the second set of command identifiers.

18. The method of claim 14, wherein the request to measure the set of performance metrics for the data storage device indicates the set of performance metrics.

19. The method of claim 14, wherein transmitting the set of performance metrics to the computing device comprises:
determining whether a first performance metric of the set of performance metrics satisfies a threshold; and in response to determining that the first performance metric does not satisfy the threshold, transmitting a message indicating that the first performance metric is below the threshold.

20. A system, comprising:
   a computing device; and
   a performance metric device coupled to the computing device, the performance metric device comprising:
      a first interface configured to communicate with the computing device;
      a second interface configured to communicate with a data storage device; and
      a processing device coupled to the first interface and the second interface, the processing device configured to:
         receive, from the computing device via the first interface, a request to measure a set of performance metrics for the data storage device;
         identify a set of commands used to measure the set of performance metrics for the data storage device, wherein the identified set of commands are measured at a predetermined microsecond level;
         determine whether the set of commands has been performed by the data storage device;
         in response to determining that the set of commands has been performed by the data storage device, determine the set of performance metrics based on a set of results for the set of commands, wherein the set of results comprise a degree of timing accuracy based on the identified set of commands being measured at the predetermined microsecond level; and
         transmit the set of performance metrics to the computing device.

* * * * *